Patented Sept. 13, 1932

1,877,741

UNITED STATES PATENT OFFICE

MAX ALBERT KUNZ, OF MANNHEIM, AND KARL KOEBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

PRODUCTION OF NITROGENOUS ISODIBENZANTHRONES

No Drawing. Application filed October 29, 1929, Serial No. 403,354, and in Germany November 7, 1928.

The present invention relates to the production of nitrogenous isodibenzanthrones.

We have found that new vat dyestuffs of the isodibenzanthrone series which contain nitrogen are obtained by allowing hydroxylamine or its derivatives, such as phenyl hydroxylamine, or salts thereof, to act upon isodibenzanthrone or its derivatives, if desired in the presence of inorganic dissolving or suspension media capable of splitting off water, such as for instance sulphuric acid, phosphoric acid, chlorsulphonic acid and the like and/or condensing catalysts, for example metals or metal compounds, such as iron or copper, mercury and the like. During the treatment of the isodibenzanthrone or its derivatives with hydroxylamine and the like, alkylating or acylating agents, for example dimethyl sulphate, p-toluene sulphonic acid esters and the like or halogens or agents which split off halogens may be brought to reaction simultaneously or the products obtained by the action of the hydroxylamine and the like may be treated with the said agents. When the action of the hydroxylamine on the isodibenzanthrone or its derivatives is carried out in concentrated sulphuric acid, it is usually sufficient simply to add an alcohol in order to effect the alkylation and so on. The dyestuffs obtained in accordance with the present invention probably correspond to the general formula

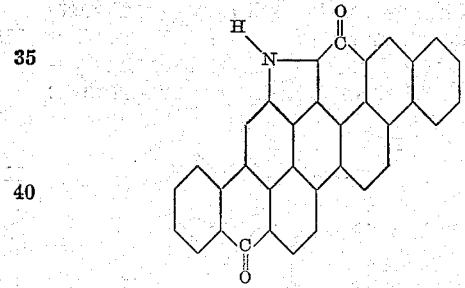

which may be substituted. They are obtained in excellent yields and in a state of great purity, dissolve in concentrated sulphuric acid giving green colorations, and generally speaking yield on cotton from blue vats, dark blue, blue violet to grey dyeings having very good fastness, and in particular having absolute fastness to chlorine. They are particularly valuable in that the dyeings obtained therewith do not undergo a change when treated with a solution of a hypochlorite, as is the case with the aminoisodibenzanthrones produced by reduction of nitroisodibenzanthrones, the greenish blue dyeings obtained with the said known aminoisodibenzanthrones changing to violet grey when treated in the said manner.

The following examples will further illustrate the nature of this invention, but the invention is not restricted to these examples. the parts are by weight.

Example 1

46 parts of pure isodibenzanthrone are dissolved while stirring in 1000 parts of sulphuric acid of 66° Baumé and after the addition of 19 parts of hydroxylamine sulphate and 50 parts of ferrous sulphate are heated slowly up to from 165° to 170° centigrade. The whole is then kept at this temperature until a sample taken out gives a blue dyeing on cotton. The whole is then allowed to cool, is poured onto ice and filtered off by suction. The dyestuff containing nitrogen which is formed probably corresponding to the formula:

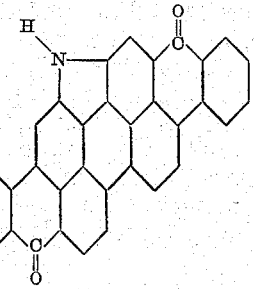

is a blue violet powder which dissolves in concentrated sulphuric acid giving a green coloration and which gives powerful dark blue dyeings of very good fastness on cotton from a blue vat. These dyeings are absolutely fast to chlorine. The condensation may also be carried out without the ferrous sulphate.

When the condensation is carried out with the addition of 25 parts of dimethyl sulphate, a dyestuff dyeing a somewhat more reddish shade and otherwise having similar dyeing properties is obtained.

Example 2

62 parts of dibrom-isodibenzanthrone obtainable by brominating isodibenzanthrone in chlorsulphonic acid with the aid of antimony as catalyst, are heated in 100 parts of concentrated sulphuric acid to from 165° to 170° C. together with 20 parts of hydroxylamine sulphate and 50 parts of ferrous sulphate while stirring and the whole is kept at this temperature for a period of about half an hour. The whole is then allowed to cool and is worked up, as described in Example 1. The dyestuff obtained, which probably corresponds to the formula:

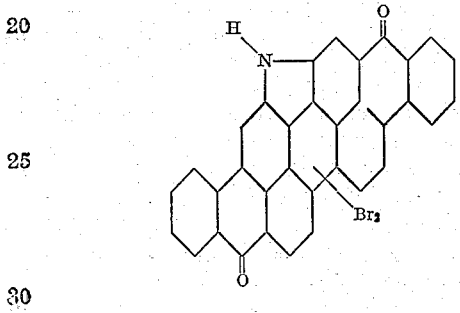

is a blue violet powder, and which in addition to bromine contains about 1 atom of nitrogen, dissolves in concentrated sulphuric acid giving a green coloration and dyes cotton from a blue vat reddish blue shades of very good fastness.

A dyestuff having similar dyeing and fastness properties is obtained when the dyestuff obtained in Example 1 is treated with bromine.

Example 3

27 parts of dichlor-isodibenzanthrone, obtainable by direct chlorination of isodibenzanthrone, are heated to from 165° to 170° C., while stirring, together with 500 parts of concentrated sulphuric acid, 10 parts of hydroxylamine sulphate and 25 parts of ferrous sulphate until a sample of the reaction product gives a blue dyeing on cotton. The whole is then allowed to cool and is worked up in the usual manner. The dyestuff obtained, which probably corresponds to the formula:

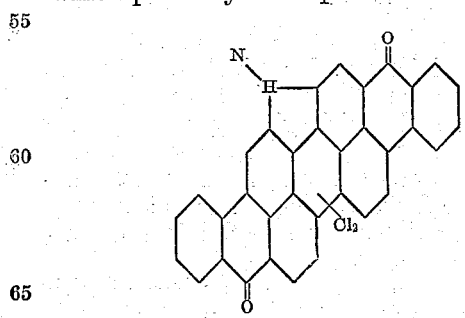

contains chlorine and nitrogen, dissolves in concentrated sulphuric acid giving a green coloration and its vat is blue.

Example 4

46 parts of isodibenzanthrone are heated, while stirring, at between 165° to 170° C. in 250 parts of concentrated sulphuric acid after the addition of 6 parts of hydroxylamine, 50 parts of ferrous sulphate and 45 parts of dimethylsulphate until a sample furnishes pure blue dyeings on cotton. The reaction mixture is then worked up, as described in Example 1. The dyestuff obtained probably corresponding to the formula:

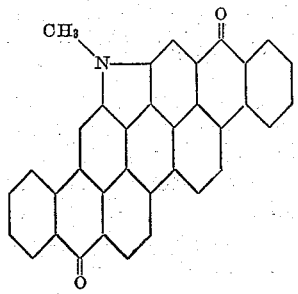

dissolves in concentrated sulphuric acid to give a green solution and its vat is blue.

What we claim is:—

1. As new articles of manufacture dyestuffs probably corresponding to the formula:

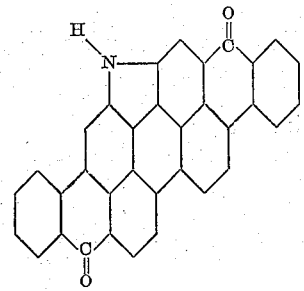

which may be halogen or N-methyl substituted, the said dyestuffs dissolving in concentrated sulphuric acid to give green solutions and dyeing cotton from blue vats usually blue shades of particularly good fastness against chlorine.

2. As a new article of manufacture the dyestuff probably corresponding to the formula:

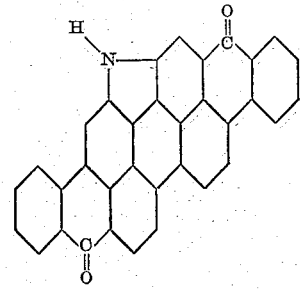

dissolving in concentrated sulphuric acid to give a green solution and dyeing cotton from a blue vat dark blue shades perfectly fast to chlorine.

3. As a new article of manufacture the dyestuff probably corresponding to the formula:

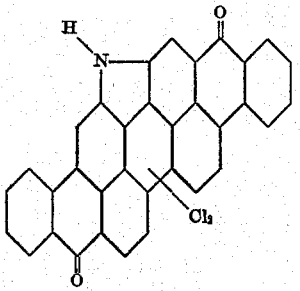

dissolving in concentrated sulfuric acid to give a green coloration and dyeing cotton blue shades from a blue vat.

4. As a new article of manufacture the dyestuff probably corresponding to the formula;

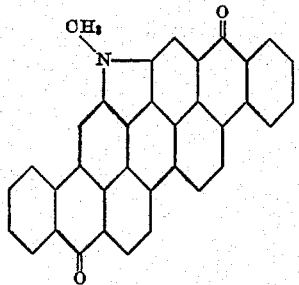

dissolving in concentrated sulfuric acid to give a green coloration and dyeing cotton blue shades from a blue vat.

In testimony whereof we have hereunto set our hands.

MAX ALBERT KUNZ.
KARL KOEBERLE.